March 4, 1958 L. A. SMITZER 2,825,434
CLUTCH AND BRAKE MECHANISM
Filed April 3, 1953 2 Sheets-Sheet 1
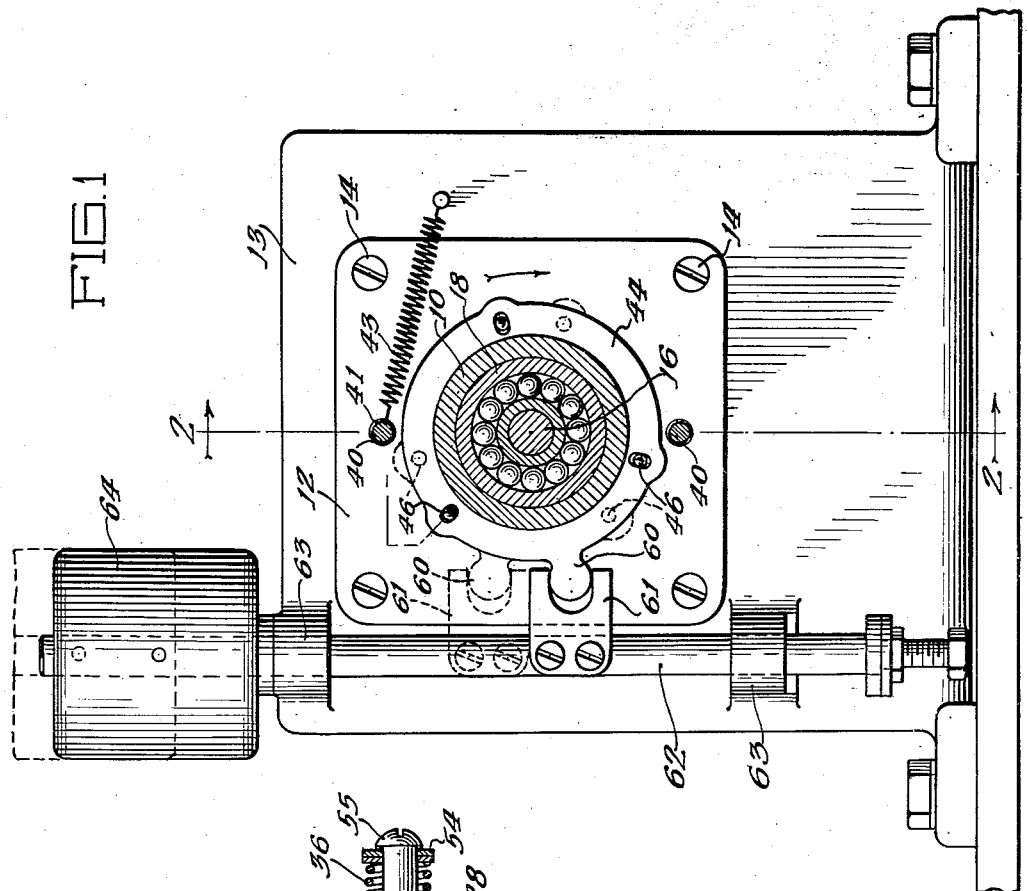
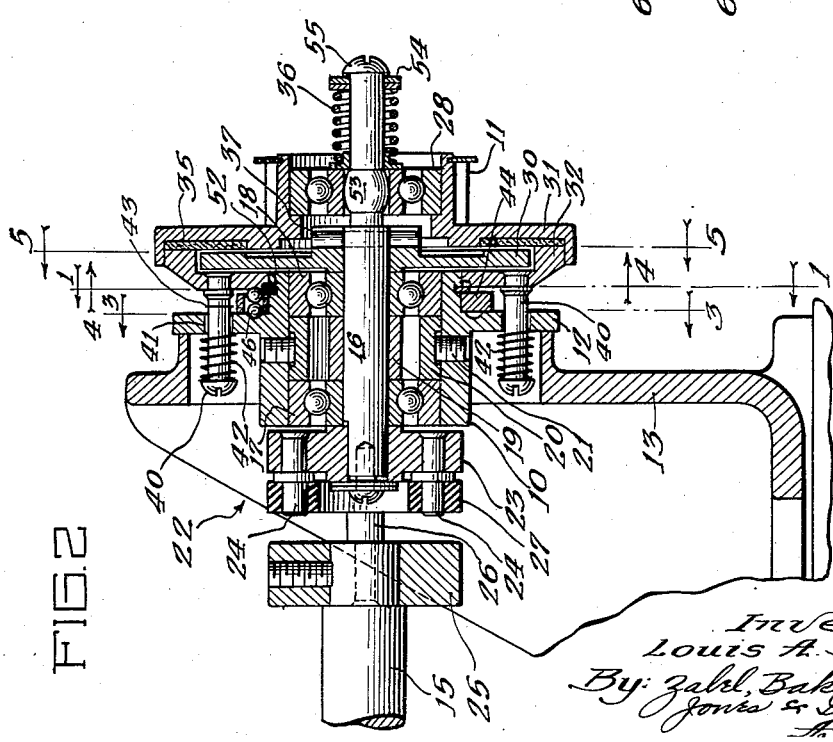
Inventor:
Louis A. Smitzer
By Zabel, Baker, York,
Jones & Githmar
Attorneys March 4, 1958 L. A. SMITZER 2,825,434
CLUTCH AND BRAKE MECHANISM
Filed April 3, 1953 2 Sheets-Sheet 2
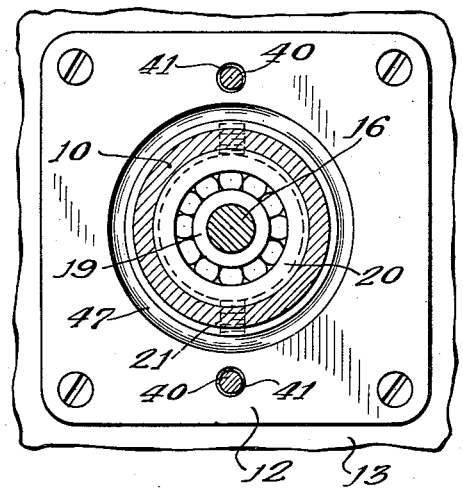
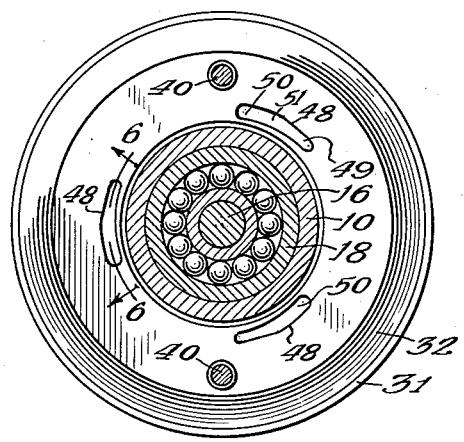
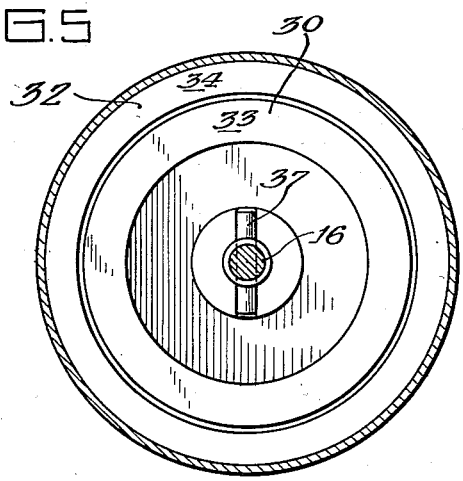
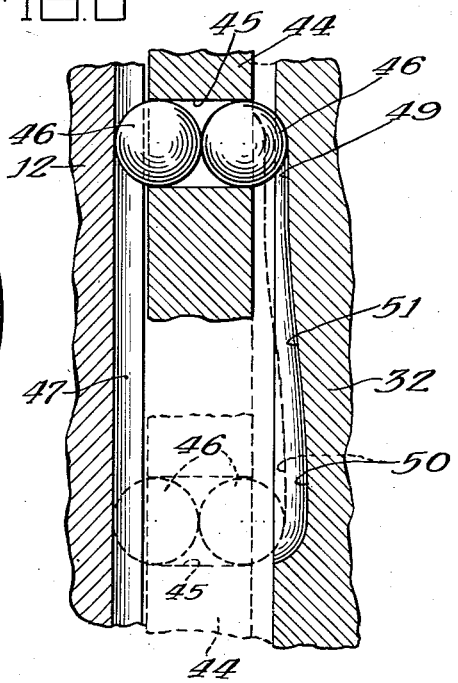
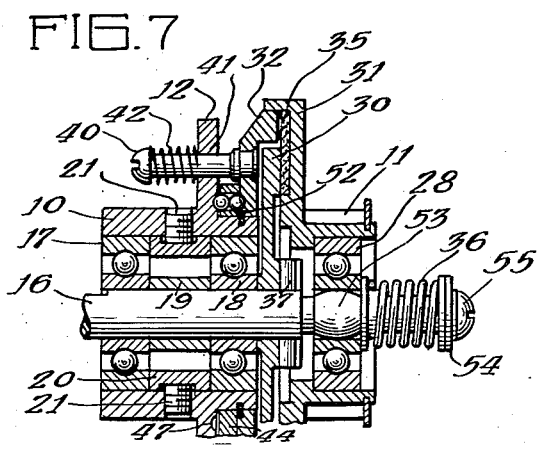
Inventor:
Louis A. Smitzer
By Zabel, Baker, York,
Jones & Dithmar
Attorneys

United States Patent Office 2,825,434
Patented Mar. 4, 1958

2,825,434

CLUTCH AND BRAKE MECHANISM

Louis A. Smitzer, Chicago, Ill., assignor to Ditto, Incorporated, Chicago, Ill., a corporation of West Virginia Application April 3, 1953, Serial No. 346,555

10 Claims. (Cl. 192—18)

This invention relates to an improved clutch and brake mechanism.

This type of device is adapted to be interposed between a continuously rotating member, such as a shaft of a motor or other power source, and a device which is to be intermittently driven therefrom.

A device of this type includes a combination of three elements, a driver, a brake and a driven member, which are concentrically arranged so that the driven member may engage either the driver to provide a clutching action in starting, or the brake to provide a braking action in stopping.

According to the present invention, this alternate engagement of the parts is provided by causing axial displacement of the brake.

It is a primary object of the present invention to provide a device of this type which requires the application of only a comparatively small control force. In this connection, I have provided substantially frictionless control means for causing axial displacement of the brake which is designed to operate with a high mechanical advantage. Thus, the present invention can be installed in machinery wherein the control mechanism or control circuit provides only a relatively small actuating force.

A further object of the present invention is to provide a device of this type in which the engaging or operating surfaces are disposed in substantially a common plane which is perpendicular to the axis of their rotation.

Another object is to provide a device of this type in which the parts are mounted so as to provide full frictional engagement of the surfaces irrespective of any misalignment of the parts, thereby assuring uniform wear of the friction surfaces.

A further object is to provide a device in which the braking and clutching surfaces have approximately equal area, thereby eliminating such differential wear of the mechanism as would destroy the adjustment of the parts.

Still another object is to provide in a device of this type in which the movable element is designed to operate on a very small stroke, improved means for positioning the parts so as to maintain the critical spacing of the parts.

A still further object is to provide an improved weight actuated means for actuating an improved brake and clutch mechanism.

Other objects, features and advantages will become apparent as the description proceeds.

With reference now to the accompanying drawings in which like reference numerals designate like parts:

Fig. 1 is a front sectional view of a clutch and brake mechanism embodying my invention, and showing also in elevation a supporting bracket and clutch actuating means; the solid lines showing parts in braked position, and the broken lines showing the parts in drive position;

Fig. 2 is a vertical axial section of the clutch and supporting member taken along line 2—2 of Fig. 1, showing the parts in braked position;

Fig. 3 is a front sectional view taken along line 3—3 of Fig. 2 and showing the flange and groove therein;

Fig. 4 is a rear sectional view taken along line 4—4 of Fig. 2 showing the brake ring and the cam grooves therein;

Fig. 5 is a front sectional view taken along line 5—5 of Fig. 2 showing the operating surfaces of the driver and of the brake ring;

Fig. 6 is an enlarged sectional view taken along the arcuate line 6—6 of Fig. 4 showing the cooperation between the control ring and its adjacent parts, the solid lines indicating the parts in braked position, and the broken lines indicating the parts in drive position; and Fig. 7 is a fragmentary axial section similar to Fig. 2, but showing the parts in drive position.

With reference now to Figs. 1 and 2, the clutch comprises a supporting sleeve 10 and a pulley 11 which comprises the output element of the clutch and brake mechanism.

The supporting sleeve 10 is provided with an integrally formed flange 12 by means of which the clutch and brake mechanism can be mounted on a suitable bracket plate 13 by means of screws 14. The mechanism is mounted so as to be in alignment with a motor shaft 15 or other source of power. It is contemplated, for instance, that the bracket may be suitably secured to a motor base or pedestal to the end that the motor and clutch and brake mechanism can be handled as a single unit and installed as such in any desired machine.

The clutch and brake mechanism also includes a drive shaft 16 which is rotatably journaled by means of ball bearing units 18 and 17 in the sleeve 10. An inner spacer 19 and an outer spacer 20 are provided to space the inner and outer raceways of the ball bearing units from each other in the axial direction. The outer spacer, and hence the ball bearing unit 18, is held against axial displacement by means of set screws 21 which engage the outer spacer in a suitable groove. Thus, the rear ball bearing unit 18 also may serve as a thrust bearing for the forces developed during operation of the mechanism.

The drive shaft 16 is connected to the motor shaft 15 by suitable coupling means 22. As shown in Fig. 2, the coupling means may include a collar 23 on the drive shaft 16 from which collar drive studs 24 project rearwardly. The coupling means also includes a similar collar 25 which is keyed or otherwise secured to the motor shaft 15 and from which collar there projects forwardly drive studs 26. The studs 24 and 26 are spaced from the axis of motor shaft 15 and are spaced 90° from each other, and are received in a rubber coupling ring 27 to provide a flexible coupling between the shafts 15 and 16.

The pulley 11 is mounted on the forward portion of the drive shaft 16 by means of a ball bearing unit 28 to the end that the pulley may be maintained in a stationary position even though the drive shaft 16 is rotating.

The principal elements of the clutch and brake mechanism include a driver 30 which is mounted on and secured to the drive shaft 16, a driven member 31 which is secured to or forms a part of the pulley 11, and a non-rotatable brake ring 32 which is mounted for axial displacement toward and away from the driven member 31.

The driver 30 and the brake ring 32 are provided with operating surfaces 33 and 34 respectively which are of substantially equal area, and which are oppositely disposed to a friction facing 35 which is carried by the driven member 31. It will be observed from Figs. 2 and 5, that the brake ring, and particularly, its operating surface 34, is disposed concentrically around the operating surface 33 of the driver. The friction facing 31 is of a width equal to the combined width of the operating surfaces 33 and 34 so that it may be alternately engaged by one or the other. A spring 36 surrounding the forward end of the drive shaft 16 bears against the ball bearing unit 28 and urges the driven member 31 into engagement with one or the other of the operating surfaces 33 or 34.

As shown in Figs. 2 and 5, the driver is generally disk-shaped, and is secured to the drive shaft 16 by means of a pin 37 so that it will rotate with the drive shaft.

The brake ring 32 is mounted on the flange 12 for axial displacement by means of studs 40. These studs project through apertures 41 formed in the flange 12 and the forward ends take into and are rigidly secured to the brake ring 32. Thus, the brake ring is free to move forwardly and backwardly, but it is urged rearwardly by means of comparatively light springs 42 which are confined between the heads of the studs and the flange 12. Thus, when the parts are in drive position, the brake ring is maintained out of engagement with the driven member 31, as shown in Fig. 7.

By virtue of this arrangement, the brake ring is held by the studs from rotation. However, a slight clearance between the studs 40 and the apertures 41 is provided for the purpose of free movement of the parts. Hence, a comparatively light spring 43, which hooks around one of the studs 40 may be suitably anchored to the bracket 13, is provided to urge the brake ring assembly one way or the other, so that the studs 40 will engage the walls of apertures 41. This is merely to take up any play in the parts; where the shaft rotates in one direction only, it is desirable to bias the brake ring in the same direction to avoid rotational movement of the brake ring when the braking force is applied.

Means are provided for displacing the brake ring 32 forwardly and into engagement with the driven ring 31. This means comprises a control ring 44, shown in Fig. 1, in which are formed a plurality of apertures 45. In each aperture, there is disposed a pair of balls 46, such as ball bearing balls. As shown in Figs. 2 and 6, the control ring is disposed between the flange 12 and the brake ring 32. These members are provided with grooves to receive the portions of the balls 46 which project beyond the confines of the control ring, and at least one of these grooves constitutes a cam groove so that the brake ring can be displaced forwardly.

In the embodiment shown, the flange 12 is provided with a continuous groove 47 of uniform depth. The rear surface of the brake ring 32 is provided with a plurality of cam grooves 48, the depth of which tapers as shown in Fig. 6.

Both of the grooved elements, the flange 12, and the brake ring 32, are stationary, in the sense of being non-rotatable. The control ring, on the other hand, is rotatably mounted on that portion of the supporting sleeve 10 which extends forwardly of the flange. Hence, as the control ring 44 is moved in the counterclockwise direction from the dotted line position in Figs. 1 and 6 to the solid line position which, in Fig. 6, is indicated by an upward movement, the right hand ball 46 will move upwardly in the cam groove and cause the brake ring to be displaced forwardly, or to the right, as shown in Fig. 6.

With respect to each of the cam grooves 48, which should be identical to each other, subject to manufacturing tolerances, there are two flat portions, the flat portion 49 corresponding to the braked position, and the flat portion 50 which corresponds to the drive position. These flat portions 49 and 50 are connected by a sloping or cam portion 51.

The flat portions provide a dwell of substantial extent to the end that the control ring 44 will tend to remain in either one of its operative positions, braked or drive. Also, the flat portions permit manufacturing control of the depth of the groove at these points with greater accuracy.

The canting of the brake disk, when in braked position, is definitely undesirable, since it tends to cause chatter and unequal wear of the friction facing 35. To minimize canting, the groove 47 is made continuous since it is easier to maintain a continuous groove depth during manufacturing. Furthermore, the thrust is taken up by the use of elements which comprise ball bearing balls 46, since the tolerances of ball bearing balls is relatively high. Thus, of the three elements, the continuous groove 47, the balls 46 and the cam grooves 48, two of those three elements can be manufactured to exceedingly close tolerances, and as pointed out previously, the provision of the flat portions facilitates the maintenance of close tolerances on the cam grooves.

Furthermore, by the use of two balls 46, there are no slipping surfaces, with the result that wear of the balls or of the grooves is minimized, thus avoiding another possible source of inaccuracy which would lead to canting.

The use of two balls also eliminates operating friction to the end that comparatively slight effort is required to shift the control ring.

To facilitate assembly, a retainer ring 52 is provided to hold the control ring in position on the supporting sleeve 10 and also to prevent free lateral movement of the control ring when parts are in braked position.

It will be observed that the forward portion of the drive shaft 16 is provided with a spherical enlargement 53 on which the ball bearing unit 28 is mounted. The spring 36 is confined at its outer end by washers 54 which are held in place by the head of a screw 55 which takes into the end of shaft 16 and thus serves to maintain the ball bearing unit on the spherical enlargement 53. The rear end of the spring 36, through a suitable washer, bears on the inner raceway of the ball bearing unit 28. Thus, the spherical enlargement and the spring cooperate to permit an adjustment of the plane of the driven member 31 and the friction facing 35, thus compensating for any wobble or canting in either the driver 30 or the brake ring 32.

Wobble of the driver may be due to manufacturing inaccuracies encountered in the mounting of the driver on the drive shaft, and canting of the brake disk may be due to wear or to manufacturing tolerances as discussed above. In either event, this universal mounting of the driven member prevents any chatter or unequal wear of the friction surfaces.

By providing an arrangement wherein the operating surfaces 33 and 34 and the friction facing 35 are all disposed perpendicular to the drive shaft 16, it is possible to compensate for any misalignment of the parts by means of this spherical enlargement 53.

The friction facing 35 is preferably stressed into the annular recess provided by the driven member so that the same may be secured without the use of rivets; the inner edge of the friction facing 35 and of the annular recess may have complementary indentations to prevent rotation of the friction facing 35 with respect to the driven member 31.

By virtue of the alignment herein shown, only a comparatively small movement of the brake ring is required. For instance, an axial displacement of 1/32 of an inch would provide 1/64 of an inch clearance between the driver surface 33 and the friction facing when the parts are in braked position, as shown in Fig. 2, and 1/64 inch clearance between the brake ring surface 34 and the friction facing when the parts are in drive position, as shown in Fig. 7. The proper adjustment in order to maintain these clearances is effected by the set screws 21 which control the axial position of the driver 30.

Any suitable means may be provided for actuating the clutch and brake mechanisms; that is, for moving the control ring 44 between its braked and drive positions. One such means is shown in Fig. 2 in which the control ring 44 is provided with a radially extending lug 60 which cooperates with a shiftable yoke 61. The lug 60 is of generally circular outline so that it may be closely embraced by the yoke 61 in the various angular positions through which it moves. The yoke 61 is mounted on a control rod 62, and the latter is mounted for vertical movement in collars 63 which are carried on the flange 12. Thus, vertical movement of the control rod 62 will cause the control ring 44 to be moved angularly from its drive position to its braked position or vice versa.

Since the movement from drive position to braked position involves work done against the force of spring 36, a weight 64 is mounted on the control rod to provide a source of kinetic energy to facilitate a rapid and sure operation of the parts. More particularly, the flat portion 50 of the cam groove permits initial downward movement of the weight 64 without effort when initially released. The kinetic energy of the weight and rod is then available for causing displacement of the brake ring against the force of the spring 36.

In order to move the control ring from its braked position to its drive position, the weight and control rod can be restored to their elevated position by suitable manual means.

The braking action may be regulated by adjusting the tension of the spring 36, or by the selection of a suitable composition friction facing 35. It will be understood that the friction facing may be formed from various suitable composition materials which have a high frictional coefficient with respect to the material of the operating surfaces 33 and 34.

According to the arrangement shown, no special facing need be provided for the operating surfaces 33 and 34. In other words, the operating surfaces are of the same material, such as steel, as the material from which the driver 30 and the brake ring 32 is formed.

The friction facing 35 may be formed of the usual brake lining material or clutch facing material.

I have found that in certain installations, the relationship of speed and load is such that there is a tendency for the parts to seize or to chatter. According to the present invention, I have overcome this difficulty by lubricating the friction facing 35 with a silicone oil.

This lubrication is effected by immersing the friction facing, before it is assembled into the driven element, in silicone oil for a substantial length of time, to the end that the oil will be taken up by or absorbed into the friction facing. Then, when the parts are assembled, the absorbed oil provides sufficient lubrication for the life of the clutch. In other words, I have found that silicone oil does not get gummy or hardened or lose its lubricating properties. Furthermore, there is no loss of oil during operation with the result that there is no necessity to add additional oil during the life of the clutch.

As a specific example, I have fabricated the friction facing 35 from a material known as "Raybestos Manhattan Brake Lining Type 451." This friction facing is then immersed or saturated with "Dow-Corning Silicone Oil #200, grade 50." The clutch embodying the above example has operated satisfactorily for more than three million starts and stops.

The foregoing is given merely as an example, since I have found that various types of facing material may be lubricated with various types of silicone oil to give eminently satisfactory results.

The operation of the clutch and brake mechanism has been described in detail in connection with the description and various parts and sub-assemblies thereof. In summary, when the weight 64 is in its elevated position, as shown in dotted lines in Fig. 1, the parts are in the drive position shown in Fig. 7. Upon release of the weight 64, its downward movement causes angular displacement of the control ring 44 into the solid line position shown in Figs. 1 and 6. This causes forward movement of the brake ring 32 to the end that the driving connection between the driver 30 and the driven element 31 is broken. Furthermore, the friction between the non-rotating brake ring 32 and the driven element 31 causes the latter to come to a stop.

When the weight 64 is elevated, the brake ring 32 is retracted by the rotation of the control ring 44 and by the springs 42, thus causing the driven element 31 to move rearwardly into clutching engagement with the driver 30.

The proper clearance between the operating surfaces 33 and 34 and the friction facing 35, can be obtained by adjustment of the set screws 21.

Once the clearances have been correctly set, there should be no need for further adjustment since the equal area of the operating surfaces 33 and 34 eliminate differential wear of the friction facing 35, and the spring 36 automatically compensates for whatever wear may occur over the entire surface of the friction facing.

The present invention provides an exceedingly compact and easily operating mechanism with the result that it can be readily incorporated with an electric motor to provide a unitary power supply unit which embodies a clutching and braking action.

Although only a preferred embodiment of my invention has been shown and described herein, it will be understood that various modifications and changes may be made in the mechanism shown without departing from the scope of my invention as pointed out in the appended claims.

I claim:

1. A clutch and brake mechanism comprising a drive shaft, a driver secured to said drive shaft and rotating therewith, a brake ring surrounding said driver, a driven element mounted for alternate cooperation with said driver and said brake ring, said driven element being rotatably mounted on said drive shaft, spring means biasing said driven element toward said driver and brake ring, resilient means normally urging said brake ring out of engagement with said driven element, and single control means for displacing said brake ring into engagement with said driven element so that said driven element will be displaced away from said driver and out of engagement therewith, said brake ring being secured against rotation so that the rotation of said driven element will be braked.

2. A clutch and brake mechanism as claimed in claim 1 in which said brake ring displacing means comprises a control ring in combination with cam means actuated by angular displacement of said control ring.

3. A clutch and brake mechanism comprising a drive shaft, a driver member secured to said drive shaft and rotating therewith, a non-rotatable brake ring member surrounding said driver member, each of said members being provided with concentric operating surfaces arranged perpendicular to the axis of said drive shaft, an axially displaceable driven element having a single coplanar cooperating surface disposed for alternate cooperation with both of said operating surfaces, said driven element being rotatably mounted on said drive shaft, spring means biasing said driven element toward said operating surfaces, resilient means normally urging one of said members out of engagement with said driven element, and single control means for axially displacing said one of said members into engagement with said driven element so that said driven element will be displaced away from the other of said members and out of engagement therewith.

4. A clutch and braking mechanism as claimed in claim 3 in which said mechanism includes a supporting sleeve for said drive shaft, a pair of ball bearing units mounted within said supporting sleeve, said drive shaft being journaled within said ball bearing units, an outer spacer ring disposed between said ball bearing unit, and means extending through said supporting sleeve and engaging said spacer ring to prevent axial displacement thereof, said driver member bearing against one of said ball bearing units so that the thrust on said driver member is transmitted through said last-mentioned ball bearing unit and said spacer ring to said sleeve.

5. A clutch and brake mechanism comprising a drive shaft, a driver member secured to said drive shaft and rotating therewith, a non-rotatable ring member surrounding said driver member, each of said members being provided with concentric operating surfaces arranged perpendicular to the axis of said drive shaft, said drive shaft being extended forwardly beyond said driver member and being provided with a spherical enlargement thereon, a driven element rotatably mounted on said spherical enlargement and having a single coplanar cooperating surface disposed for alternate cooperation with both of said operating surfaces, spring means biasing said driven element toward said operating surfaces, and means for axially displacing one of said members into engagement with said driven element so that said driven element will be displaced away from the other of said members and out of engagement therewith.

6. A clutch and brake mechanism comprising a drive shaft, a driver secured to said drive shaft and rotating therewith, an axially displaceable stationary brake ring surrounding said driver, a driven element mounted for alternate cooperation with said driver and said brake ring, said driver being rotatably mounted on said drive shaft, spring means biasing said driven member toward said driver and brake ring, a control ring for displacing said brake ring into engagement with said driven element so that said driven element will be displaced away from said driver and out of engagement therewith, supporting means for said drive shaft including a flange disposed rearwardly of said brake ring, said control ring being disposed between said flange and said brake ring, said flange and said brake ring having oppositely disposed surfaces which are arranged perpendicular to the axis of said drive shaft, and each having a set of oppositely disposed groove portions formed in said surfaces, said groove portions being of arcuate shape, said control ring having apertures located to register with said oppositely disposed groove portions, and thrust elements disposed within said apertures and extending into said groove portions, one set of said groove portions being of tapering depth to provide a cam surface whereby rotation of said control ring will cause relative movement of said thrust elements with respect to said groove portions and consequent axial displacement of said brake ring.

7. A clutch and brake mechanism as claimed in claim 6 in which said thrust elements comprise a pair of balls.

8. A clutch and brake mechanism as claimed in claim 6 in which said tapering groove portion is provided with flat portions at either end thereof to provide two dwells, one for drive position and one for braked position.

9. A clutch and brake mechanism as claimed in claim 8 including weight actuated means engaging said control ring for rotating the same from drive position into braked position against the bias of said spring means and means for mounting said weight actuated means for free falling movement, whereby said first-mentioned dwell permits free falling movement of said weight actuated means prior to the time that any work is done against said spring means so that the kinetic energy of said weight actuated means will be available for the displacement of said control ring against said spring means.

10. In a clutch and brake mechanism of the class described including a supporting sleeve, a non-rotatable axially displaceable brake ring member, a driven member mounted adjacent thereto at one side thereof and a flange member on said sleeve disposed adjacent to said brake ring member at the opposite side thereof, the combination of a control ring disposed between said members and mounted on said supporting sleeve for angular displacement, one of said members including arcuate cam means, said control ring being provided with an opening therein opposite said cam means, and a pair of balls disposed in said opening and being confined therein by said members whereby angular displacement of said control ring with respect to said members will cause relative displacement of said balls in an axial direction by said cam means, thereby causing said balls to displace positively said brake ring member into engagement with said driven member.

References Cited in the file of this patent
UNITED STATES PATENTS

| | | |
|---|---|---|
| 1,265,595 | Biggert | May 7, 1918 |
| 1,395,744 | Seigle | Nov. 1, 1921 |
| 1,846,583 | Chase | Feb. 23, 1932 |
| 1,981,501 | Geldhof | Nov. 20, 1934 |
| 2,111,143 | Geldhof | Mar. 15, 1938 |
| 2,291,088 | Morgenstern | July 28, 1942 |
| 2,415,097 | Hasimoto | Feb. 4, 1947 |
| 2,446,138 | Lambert | July 27, 1948 |
| 2,531,558 | Debrie | Nov. 28, 1950 |
| 2,549,245 | Schultz | Apr. 17, 1951 |

FOREIGN PATENTS

| | | |
|---|---|---|
| 611,595 | Germany | Apr. 2, 1935 |